United States Patent
Liu et al.

(10) Patent No.: US 11,294,656 B2
(45) Date of Patent: Apr. 5, 2022

(54) SYSTEM AND METHOD FOR DEVELOPING THIRD-PARTY APPLICATION

(71) Applicant: BYD COMPANY LIMITED, Guangdong (CN)

(72) Inventors: Yang Liu, Shenzhen (CN); Hua Huang, Shenzhen (CN); Qun Liang, Shenzhen (CN); Chunfen Wu, Shenzhen (CN); Yilin Zhong, Shenzhen (CN)

(73) Assignee: BYD Company Limited, Guangdong (CN)

( * ) Notice: Subject to any disclaimer, the term of this patent is extended or adjusted under 35 U.S.C. 154(b) by 0 days.

(21) Appl. No.: 17/046,669

(22) PCT Filed: Apr. 15, 2019

(86) PCT No.: PCT/CN2019/082757
§ 371 (c)(1),
(2) Date: Oct. 9, 2020

(87) PCT Pub. No.: WO2019/201218
PCT Pub. Date: Oct. 24, 2019

(65) Prior Publication Data
US 2021/0182044 A1    Jun. 17, 2021

(30) Foreign Application Priority Data
Apr. 16, 2018    (CN) .......................... 201810340112.X

(51) Int. Cl.
*G06F 8/61*    (2018.01)
*G06F 8/30*    (2018.01)
(Continued)

(52) U.S. Cl.
CPC .................. *G06F 8/61* (2013.01); *G06F 8/30* (2013.01); *G06F 21/51* (2013.01); *H04L 12/40* (2013.01);
(Continued)

(58) Field of Classification Search
CPC ....................................................... G06F 8/61
See application file for complete search history.

(56) References Cited

U.S. PATENT DOCUMENTS 9,841,969 B2    12/2017 Seibert et al.
2008/0139365 A1*    6/2008 Lee .................... F16H 61/061
477/156
(Continued)

FOREIGN PATENT DOCUMENTS

CN    102567612 A    7/2012
CN    103546358 A    1/2014
(Continued)

OTHER PUBLICATIONS

English Translation of International Search Report from PCT/CN2019/082757 dated Jul. 22, 2019 (2 pages).
(Continued)

*Primary Examiner* — Jae U Jeon
(74) *Attorney, Agent, or Firm* — Calfee Halter & Griswold LLP

(57) ABSTRACT

The present disclosure discloses a system and a method for developing a third-party application. The system includes: a vehicle-mounted device and a developer platform communicating with each other. The vehicle-mounted device generates a corresponding API according to a protocol analysis mode of a vehicle signal and API specifications, adds the API to a software development kit SDK, and sends the API to the developer platform. The developer platform publishes
(Continued)

A vehicle-mounted device obtains a vehicle signal, the vehicle signal including vehicle status information sent by each detection module through a vehicle communication network, or a control instruction to be sent to each actuator through the vehicle communication network, or the vehicle status information and the control instruction, generates a corresponding API according to a protocol analysis mode of the vehicle signal and API specifications, adds the API to a software development kit SDK, and sends the API to a developer platform — S1

The developer platform publishes the SDK so that a developer develops a third-party application according to the API in the SDK — S2 the SDK so that a developer can develop a third-party application according to the API in the SDK.

20 Claims, 3 Drawing Sheets

(51) Int. Cl.
*G06F 21/51* (2013.01)
*H04L 12/40* (2006.01)
*H04L 67/12* (2022.01)

(52) U.S. Cl.
CPC .... *H04L 67/12* (2013.01); *H04L 2012/40215* (2013.01); *H04L 2012/40273* (2013.01)

(56) References Cited

U.S. PATENT DOCUMENTS

| | | |
|---|---|---|
| 2012/0096477 A1 | 4/2012 | Lee et al. |
| 2017/0078398 A1 | 3/2017 | Haidar et al. |
| 2018/0011694 A1 | 1/2018 | Al-Fuqaha et al. |
| 2019/0012150 A1* | 1/2019 | Dimitrov ................ G06F 8/315 |
| 2020/0033847 A1* | 1/2020 | Way ..................... G05D 1/0022 |

FOREIGN PATENT DOCUMENTS

| | | |
|---|---|---|
| CN | 104657300 A | 5/2015 |
| CN | 107835980 A | 3/2018 |

OTHER PUBLICATIONS

Doo Seop Yun et al: "Development of Mobile Common Component for providing vehicle information on mobile device", Computer Sciences and Convergence Information Technology (ICCIT), 2011 6th International Conference ON, IEEE, Nov. 29, 2011 (Nov. 29, 2011), pp. 889-812.

* cited by examiner

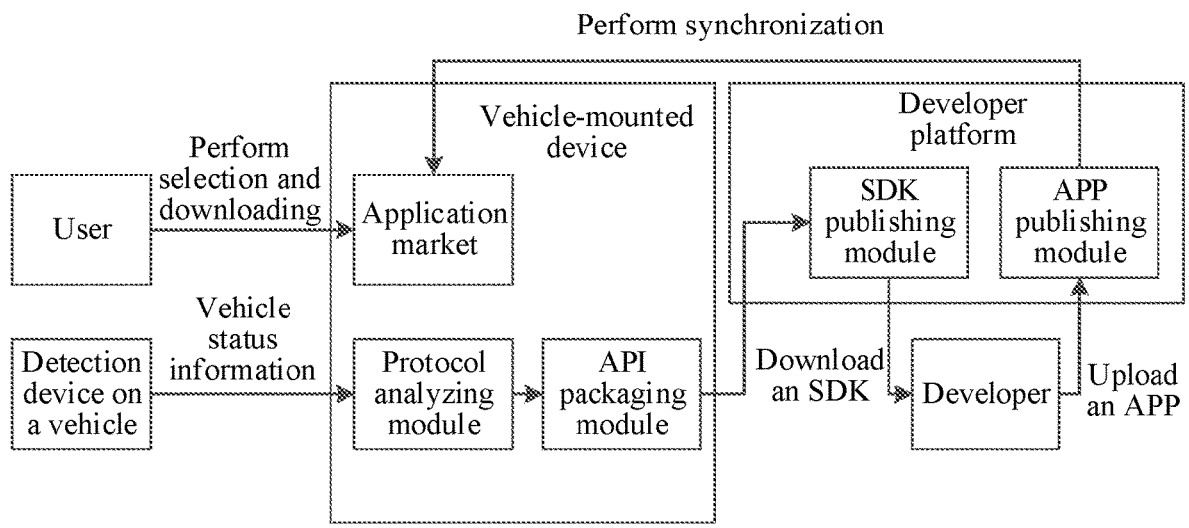

FIG. 5

| A vehicle-mounted device obtains a vehicle signal, the vehicle signal including vehicle status information sent by each detection module through a vehicle communication network, or a control instruction to be sent to each actuator through the vehicle communication network, or the vehicle status information and the control instruction, generates a corresponding API according to a protocol analysis mode of the vehicle signal and API specifications, adds the API to a software development kit SDK, and sends the API to a developer platform | S1 |

| The developer platform publishes the SDK so that a developer develops a third-party application according to the API in the SDK | S2 |

FIG. 6

SYSTEM AND METHOD FOR DEVELOPING THIRD-PARTY APPLICATION

CROSS-REFERENCE TO RELATED APPLICATIONS

The present disclosure is the National Phase of International Application No. PCT/CN2019/082757, filed on Apr. 15, 2019, which is based on and claims priority to Chinese patent application No. 201810340112.X filed on Apr. 16, 2018. The entire contents of the above-referenced applications are incorporated herein by reference.

FIELD

The present disclosure relates to the technical field of vehicles, and in particular, to a system and a method for developing a third-party application.

BACKGROUND

With the development of intelligence and networking of vehicles, vehicle-mounted multimedia in vehicles gradually adopt open systems such as Android, etc., and some third-party applications on mobile phones may also be installed on the vehicle-mounted multimedia in time. However, current third-party applications installed on vehicle-mounted multimedia generally include only entertainment functions, and cannot provide users with vehicle-specific functions based on vehicle status information, such as a reminder for an excessively low fuel level, etc. Third-party applications that provide users with vehicle-specific functions based on vehicle status information need to be specially developed by using vehicle communication network protocols. Development difficulty is high, costs are high, and no general applicability is provided, affecting experience of a user when using vehicle-mounted multimedia.

SUMMARY

The present disclosure is intended to resolve at least one of the technical problems in the related art to some extent.

To this end, a first purpose of the present disclosure is to propose a system for developing a third-party application, to relieve poor vehicle safety in the prior art.

A second purpose of the present disclosure is to propose a method for developing a third-party application.

In order to achieve the above purposes, an embodiment of a first aspect of the present disclosure proposes a system for developing a third-party application, including: a vehicle-mounted device and a developer platform communicating with each other;
  the vehicle-mounted device being configured to: obtain a vehicle signal, the vehicle signal including vehicle status information sent by each detection module through a vehicle communication network, or a control instruction to be sent to each actuator through the vehicle communication network, or the vehicle status information and the control instruction; and generate a corresponding API according to a protocol analysis mode of the vehicle signal and API specifications, add the API to a software development kit SDK, and send the API to the developer platform; and
  the developer platform being configured to publish the SDK so that a developer develops a third-party application according to the API in the SDK.

In the system for developing a third-party application in the embodiment of the present disclosure, the vehicle-mounted device generates the corresponding API according to the protocol analysis mode of the vehicle signal and the API specifications, adds the API to the software development kit SDK, and sends the API to the developer platform. The developer platform publishes the SDK so that the developer can develop a third-party application according to the API in the SDK. Development difficulty is low, costs are low, and universal applicability is provided. In addition, the developed third-party application can provide a user with vehicle-specific functions based on the vehicle signal. After the third-party application is installed on the vehicle-mounted device, vehicle-mounted multimedia can provide a user with vehicle-specific functions, improving experience of the user when using the vehicle-mounted multimedia.

In order to achieve the above purposes, an embodiment of a second aspect of the present disclosure proposes a method for developing a third-party application. A vehicle-mounted device and a developer platform communicate with each other. The method includes the following steps:
  obtaining, by the vehicle-mounted device, a vehicle signal, the vehicle signal including vehicle status information sent by each detection module through a vehicle communication network, or a control instruction to be sent to each actuator through the vehicle communication network, or the vehicle status information and the control instruction; generating a corresponding API according to a protocol analysis mode of the vehicle signal and API specifications, adding the API to a software development kit SDK, and sending the API to the developer platform; and
  publishing, by the developer platform, the SDK so that a developer develops a third-party application according to the API in the SDK.

In the method for developing a third-party application in the embodiment of the present disclosure, the vehicle-mounted device generates the corresponding API according to the protocol analysis mode of the vehicle signal and the API specifications, adds the API to the software development kit SDK, and sends the API to the developer platform. The developer platform publishes the SDK so that the developer can develop a third-party application according to the API in the SDK. Development difficulty is low, costs are low, and universal applicability is provided. In addition, the developed third-party application can provide a user with vehicle-specific functions based on the vehicle signal. After the third-party application is installed on the vehicle-mounted device, vehicle-mounted multimedia can provide a user with vehicle-specific functions, improving experience of the user when using the vehicle-mounted multimedia.

Additional aspects and advantages of the present disclosure are partially given in the following description, which are partially obvious from the description below or understood through the practice of the present disclosure.

BRIEF DESCRIPTION OF THE DRAWINGS

The above and/or additional aspects and advantages of the present disclosure become obvious and comprehensible in the description of the embodiments with reference to the following accompanying drawings, in which.

FIG. 5 is a schematic use diagram of a system for developing a third-party application according to an embodiment of the present disclosure; and FIG. 6 is a flowchart of a method for developing a third-party application according to an embodiment of the present disclosure.

REFERENCE NUMERAL S

Figure 1:
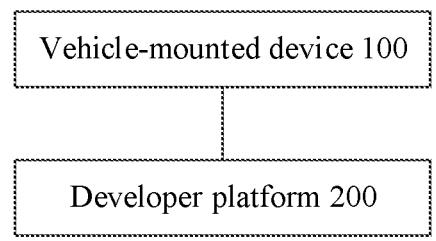
FIG. 1 is a schematic block diagram of a system for developing a third-party application according to an embodiment of the present disclosure.

Vehicle-mounted device—100; Developer platform—200; Protocol analyzing module—110; API packaging module—120; Application market—130; SDK publishing module—210; APP publishing module—220.

DETAILED DESCRIPTION

Embodiments of the present disclosure are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

A system and a method for developing a third-party application in the embodiments of the present disclosure are described below in combination with the drawings.

FIG. 1 is a schematic block diagram of a system for developing a third-party application according to an embodiment of the present disclosure. As shown in FIG. 1, the system for developing a third-party application in the embodiment of the present disclosure includes: a vehicle-mounted device 100 and a developer platform 200. The vehicle-mounted device 100 and the developer platform 200 communicate with each other.

The vehicle-mounted device 100 is configured to: obtain a vehicle signal; the vehicle signal including vehicle status information sent by each detection module through a vehicle communication network, or a control instruction to be sent to each actuator through the vehicle communication network, or the vehicle status information and the control instruction; and generate a corresponding API according to the vehicle signal, add the application programming interface (API) to a software development kit SDK, and send the API to the developer platform.

The developer platform 200 is configured to publish the SDK so that a developer develops a third-party application according to the API in the SDK.

In this embodiment, the vehicle-mounted device 100 and the developer platform 200 may communicate in a wireless or wired manner. The wireless manner may be, for example, a 4th Generation mobile communication technology (4G) network or a 5th Generation mobile communication technology (5G) network, etc. The wired manner may be, for example, a universal serial bus (USB) or the Ethernet, etc. The developer platform 200 may be, for example, a cloud server corresponding to a vehicle. The vehicle-mounted device 100 may be, for example, vehicle-mounted multimedia or a vehicle machine, etc.

In this embodiment, when no software development kit SDK is integrated in the vehicle-mounted device, when the vehicle-mounted device obtains, for the first time, the vehicle status information sent by each detection module, or obtains, for the first time, the control instruction to be sent to each actuator, the vehicle-mounted device may perform processing such as protocol analysis, etc. on the vehicle status information or the control instruction, and generate a corresponding API according to the protocol analysis mode, etc., so as to obtain an API corresponding to each detection module or each actuator. The vehicle status information is, for example, a vehicle speed, a fuel level, a battery level, driving information (for example, acceleration, deceleration, sudden braking, or rapid acceleration, etc.) of a current vehicle, or a status of a current vehicle-mounted air conditioner, etc. The detection module is, for example, a vehicle speed detection module, a fuel level detection module, an external environment information detection module, a vehicle driving information detection module, an air conditioner detection module, or a light detection module, etc. The vehicle speed detection module may be, for example, a speed sensor or an acceleration sensor, etc.

In this embodiment, after the vehicle is powered on, each detection module of the vehicle may start to send vehicle status information to the vehicle communication network. After initialization of the vehicle-mounted device 100 is completed, the vehicle communication network may send the vehicle status information to the vehicle-mounted device 100, and then the vehicle-mounted device generates an API. Alternatively, when an SDK is integrated, the vehicle status information is sent to the corresponding third-party application for processing according to the invoking of the API performed by the third-party application.

In this embodiment, after the vehicle is powered on, each actuator of the vehicle may receive the control instruction through the vehicle communication network. After initialization of the vehicle-mounted device 100 is completed, the vehicle communication network may send the control instruction to the vehicle-mounted device 100, and then the vehicle-mounted device 100 generates an API. Alternatively, when an SDK is integrated, the vehicle-mounted device 100 may send the control instruction to the corresponding actuator according to the invoking of the API performed by the third-party application.

In this embodiment, the vehicle-mounted device 100 may receive, through the vehicle communication network, the vehicle status information sent by each detection module, and/or send the control instructions to each actuator. The vehicle communication network includes a communication gateway and a communication bus. The vehicle-mounted device 100 and the communication gateway communicate with each other by using a preset communication rule, to receive the vehicle status information of the detection module on the communication bus and deliver the control instruction to the corresponding actuator on the vehicle through the communication gateway. The communication bus is, for example, a CAN bus, etc.

In the system for developing a third-party application in the embodiment of the present disclosure, the vehicle-mounted device generates the corresponding API according to the protocol analysis mode of the vehicle signal and the API specifications, adds the API to the software development kit SDK, and sends the API to the developer platform. The developer platform publishes the SDK so that the developer develops a third-party application according to the API in the SDK. Development difficulty is low, costs are low, and universal applicability is provided. In addition, the developed third-party application can provide a user with vehicle-specific functions based on the vehicle signal. After the third-party application is installed on the vehicle-mounted device, vehicle-mounted multimedia can provide a user with vehicle-specific functions, improving experience of the user when using the vehicle-mounted multimedia.

Figure 2:
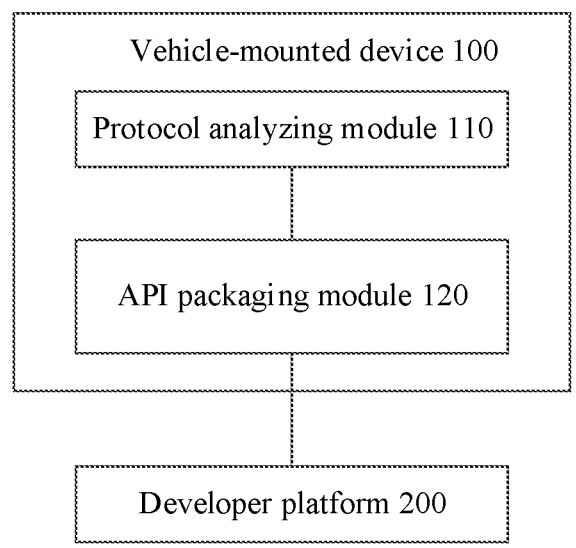
FIG. 2 is a schematic block diagram of a system for developing a third-party application according to another embodiment of the present disclosure.

With reference to FIG. 2, on the basis of the embodiment shown in FIG. 1, the vehicle-mounted device 100 includes: a protocol analyzing module 110 and an API packaging module 120.

The protocol analyzing module 110 is configured to analyze the vehicle signal to obtain the protocol analysis mode of the vehicle signal.

The API packaging module 120 is configured to generate, through packaging, the corresponding API according to the protocol analysis mode and the API specifications.

In this embodiment, a format of the vehicle signal received by the vehicle-mounted device 100 varies in case of different detection modules or different actuators or different communication buses. For example, the communication bus is a CAN bus and the detection module is a fuel level detection module. In this case, the vehicle state information obtained by the vehicle-mounted device may specifically be CAN message information including a fuel level. The fuel level is at a specific position in the CAN message information. According to a format of the CAN message information and the position of the fuel level in the CAN message information, etc., the protocol analyzing module 110 may obtain a protocol analysis mode of the CAN message information including the fuel level. Then the API packaging module 120 may generate, through packaging, the corresponding API according to the protocol analysis mode and the API specifications.

The protocol analysis mode may be, for example, a communication protocol defined between the vehicle-mounted device and the vehicle communication network, for example, the format of the CAN message agreed between the vehicle-mounted device and the vehicle communication network. The format is, for example, parameter information included in the CAN message and an instruction number corresponding to each piece of parameter information, so that the vehicle communication network can identify the CAN message and determine vehicle status information to be obtained by the vehicle-mounted device or a control instruction to be sent by the vehicle-mounted device. The API may include verbs and incoming parameters. API specifications may be, for example, agreed operations that need to be performed based on the incoming parameters and the verbs, such as an API "OpenAC( )" corresponding to opening of an air conditioner. OpenAC is a verb corresponding to the opening of the air conditioner, and the incoming parameters, such as a temperature of the air conditioner, may be filled in brackets. In this embodiment, the vehicle-mounted device may determine, according to the API specifications, required operations and incoming parameters, and then encapsulate the operations and the incoming parameters according to the protocol analysis mode to obtain a vehicle signal that can be identified by the detection module or the actuator, and send the vehicle signal to the vehicle communication network, so that the vehicle communication network sends the vehicle signal to the corresponding detection module or actuator.

Figure 3:
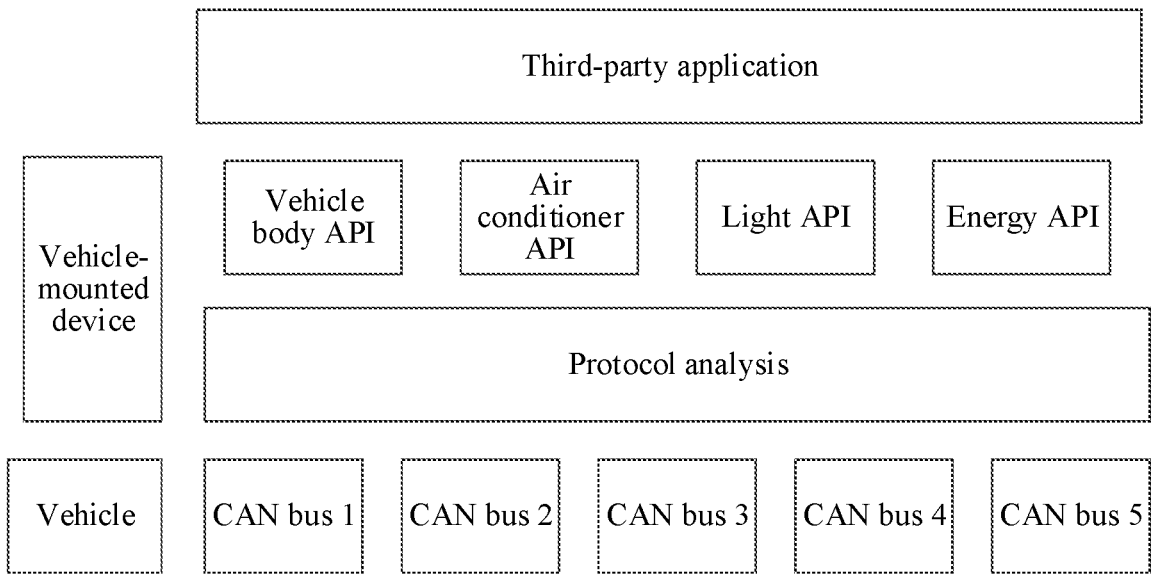
FIG. 3 is a schematic diagram of receiving CAN message information through each CAN bus on a vehicle and generating an API.

For example, FIG. 3 is a schematic diagram of receiving CAN message information through each CAN bus on a vehicle and generating an API. In FIG. 3, a type of the API may be, for example, a vehicle body API, an air conditioner API, a light API, and an energy API, etc.

On the basis of the embodiment shown in FIG. 2, the protocol analyzing module 110 may be specifically configured to analyze the vehicle signal to obtain an analyzed vehicle signal; determine, according to the analyzed vehicle signal, whether to allow the vehicle signal to be opened to a third-party application; and if the vehicle signal is not allowed to be opened to the third-party application, perform no processing. A vehicle signal not allowed to be opened to the third-party application may be, for example, a vehicle signal related to vehicle control.

In this embodiment, after analyzing the vehicle signal, the protocol analyzing module 110 may first query a signal list according to the analyzed vehicle signal. The signal list includes a vehicle signal allowed to be opened to the third-party application or a vehicle signal not allowed to be opened to the third-party application. The protocol analyzing module determines, according to a result of querying the signal list, whether to allow the vehicle signal to be opened to the third-party application. If the vehicle signal is not allowed to be opened to the third-party application, the protocol analysis mode of the vehicle signal is not obtained, and the corresponding API is not generated. In this way, the third-party application cannot obtain the corresponding vehicle signal through the API, improving vehicle safety.

In the system for developing a third-party application in the embodiment of the present application, the protocol analyzing module in the vehicle-mounted device analyzes the vehicle signal to obtain the protocol analysis mode of the vehicle signal, and the API packaging module generates, through packaging, the corresponding API according to the protocol analysis mode and the API specifications, adds the API to the software development kit SDK, and sends the API to the developer platform. The developer platform publishes the SDK so that the developer can develop a third-party application according to the API in the SDK. Development difficulty is low, costs are low, and universal applicability is provided. In addition, the developed third-party application can provide a user with vehicle-specific functions based on the vehicle signal. After the third-party application is installed on the vehicle-mounted device, vehicle-mounted multimedia can provide a user with vehicle-specific functions, improving experience of the user when using the vehicle-mounted multimedia.

Figure 4:
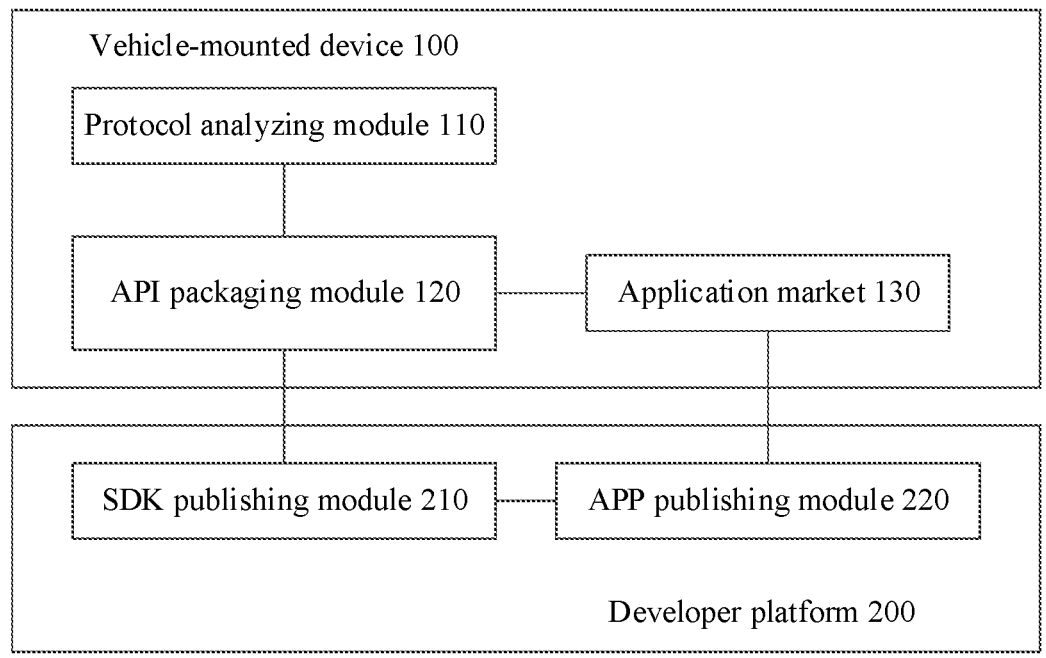
FIG. 4 is a schematic block diagram of a system for developing a third-party application according to still another embodiment of the present disclosure.

With reference to FIG. 4, on the basis of the embodiment shown in FIG. 2, the developer platform 200 may include: an SDK publishing module 210 and an APP publishing module 220.

The SDK publishing module 210 is configured to publish the SDK after obtaining the SDK sent by the vehicle-mounted device, so that a developer develops, according to the API in the SDK, a third-party application that may be installed on the vehicle-mounted device. The APP publishing module 220 is configured to obtain a developed third-party application uploaded by the developer and publish the developed third-party application.

Before publishing the developed third-party application, the APP publishing module 220 may first verify the third-party application to determine whether the third-party application meets agreed conditions. The agreed conditions may be, for example, whether the third-party application is an application developed by an agreed developer or enterprise, whether the vehicle signal to be obtained for the third-party application to run is allowed to be opened to the third-party application, whether permission of the third-party application is consistent with agreed permission, and whether a key carried in the third-party application is consistent with an agreed key, etc.

In this embodiment, before publishing the developed third-party application, the APP publishing module 220 may first verify the third-party application to determine whether the third-party application meets agreed conditions. In this way, a third-party application that does not meet the agreed conditions can be prevented from being published on the developer platform, so that the third-party application that does not meet the agreed conditions is prevented from being installed on the vehicle-mounted vehicle, thereby improving safety of the vehicle.

On the basis of the embodiment shown in FIG. 4, the vehicle-mounted device 100 may further include: an application market 130.

The application market 130 is adapted to be synchronized with the developer platform 200 to obtain relevant information of the third-party application published on the developer platform 200.

In this embodiment, after obtaining the relevant information of the third-party application published by the developer platform 200, the application market 130 may display the third-party application on an interface of the application market according to the relevant information of the third-party application, so that a user of the vehicle can perform selection and downloading.

In this embodiment, when the user selects the third-party application and hits downloading, the application market 130 may obtain a third-party application downloading instruction of the user, and download the third-party application from the developer platform according to the third-party application downloading instruction.

On the basis of the above embodiment, after being successfully downloaded, the third-party application is installed on the vehicle-mounted device and started, and then the third-party application may invoke a corresponding API to obtain and process vehicle status information of a corresponding detection module on the vehicle, or send a control instruction to a corresponding actuator on the vehicle. An SDK is integrated in the third-party application.

For example, the third-party application is a fuel level reminder application. After being installed on the vehicle-mounted device and started, the fuel level reminder application may invoke a corresponding API to obtain a fuel level for processing.

On the basis of the above embodiment, the vehicle-mounted device 100 is further configured to: receive an API invoking request of the third-party application installed on the vehicle-mounted device, obtain the vehicle status information from a corresponding detection module on a vehicle in combination with the protocol analysis mode corresponding to the API and the API specifications, and return the vehicle status information to the third-party application.

The fuel level reminder application is used as an example. After receiving a fuel level returned by the vehicle-mounted device, the fuel level reminder application may determine whether the fuel level is less than a preset threshold, and prompt the user to refuel in time if the fuel level is less than the preset threshold.

In the system for developing a third-party application in the embodiment of the present application, the protocol analyzing module in the vehicle-mounted device analyzes the vehicle signal to obtain the protocol analysis mode of the vehicle signal, and the API packaging module generates, through packaging, the corresponding API according to the protocol analysis mode and the API specifications, adds the API to the software development kit SDK, and sends the API to the developer platform. The developer platform publishes the SDK so that the developer can develop a third-party application according to the API in the SDK. Development difficulty is low, costs are low, and universal applicability is provided. In addition, the developed third-party application can provide a user with vehicle-specific functions based on the vehicle signal. The application market in the vehicle-mounted device is synchronized with the developer platform to obtain the relevant information of the third-party application published on the developer platform and download the third-party application from the developer platform according to the third-party application downloading instruction of the user and install the third-party application on the vehicle-mounted device, so that vehicle-mounted multimedia can provide a user with vehicle-specific functions, improving experience of using the vehicle-mounted multimedia for the user.

FIG. 5 is a schematic use diagram of a system for developing a third-party application according to an embodiment of the present disclosure. As shown in FIG. 5, an execution process of the system for developing a third-party application may be specifically as follows:

(1) The detection device on the vehicle sends vehicle status information to the vehicle-mounted device; (2) the protocol analyzing module in the vehicle-mounted device is configured to: analyze the vehicle status information, and when the analyzed vehicle status information is vehicle status information allowed to be opened to the third-party application, obtain a protocol analysis mode of the vehicle status information; and the API packaging module in the vehicle-mounted device is configured to generate, through packaging, a corresponding API according to the protocol analysis mode and API specifications, add the API to the software development kit SDK, and send the API to the developer platform; (3) the SDK publishing module in the developer platform is configured to publish the SDK; and the APP publishing module in the developer platform is configured to: obtain a developed third-party application uploaded by a developer, and when the developed third-party application meets agreed conditions, publish the developed third-party application; (4) the application market in the vehicle-mounted device is adapted to be synchronized with the developer platform to obtain relevant information of the third-party application published on the developer platform, and when a third-party application downloading instruction of a user of the vehicle is received, download the third-party application from the developer platform according to the third-party application downloading instruction; and (5) when receiving an API invoking request from the third-party application, the vehicle-mounted device interacts with the corresponding detection module on the vehicle to obtain the vehicle status information and return the vehicle status information to the third-party application.

In the system for developing a third-party application in the embodiment of the present application, the protocol analyzing module in the vehicle-mounted device analyzes the vehicle status information sent by each detection module on the vehicle through the vehicle communication network, to obtain the protocol analysis mode of the vehicle status information, and the API packaging module generates, through packaging, the corresponding API according to the protocol analysis mode and the API specifications, adds the API to the software development kit SDK, and sends the API to the developer platform. The developer platform publishes the SDK so that the developer can develop a third-party application according to the API in the SDK. Development difficulty is low, costs are low, and universal applicability is provided. In addition, the developed third-party application can provide a user with vehicle-specific functions based on the vehicle status information. The application market in the vehicle-mounted device is synchronized with the developer platform to obtain the relevant information of the third-party application published on the developer platform and download the third-party application from the developer platform according to the third-party application downloading instruction of the user and install the third-party application on the vehicle-mounted device, so that vehicle-mounted multimedia can provide a user with vehicle-specific functions, improving experience of using the vehicle-mounted multimedia for the user.

FIG. 6 is a flowchart of a method for developing a third-party application according to an embodiment of the present disclosure.

As shown in FIG. 6, the method for developing a third-party application in the embodiment of the present disclosure includes the following steps.

S1: A vehicle-mounted device obtains a vehicle signal, the vehicle signal including vehicle status information sent by each detection module through a vehicle communication network, or a control instruction to be sent to each actuator through the vehicle communication network, or the vehicle status information and the control instruction, generates a corresponding API according to a protocol analysis mode of the vehicle signal and API specifications, adds the application programming interface (API) to a software development kit SDK, and sends the API to a developer platform.

S2: The developer platform publishes the SDK so that a developer develops a third-party application according to the API in the SDK.

In this embodiment, when no software development kit SDK is integrated in the vehicle-mounted device, when the vehicle-mounted device obtains, for the first time, the vehicle status information sent by each detection module, or obtains, for the first time, the control instruction to be sent to each actuator, the vehicle-mounted device may perform processing such as protocol analysis, etc. on the vehicle status information or the control instruction, and generate a corresponding API according to the protocol analysis mode, etc., so as to obtain an API corresponding to each detection module or each actuator. The vehicle status information is, for example, a vehicle speed, a fuel level, a battery level, driving information (for example, acceleration, deceleration, sudden braking, or rapid acceleration, etc.) of a current vehicle, or a status of a current vehicle-mounted air conditioner, etc. The detection module is, for example, a vehicle speed detection module, a fuel level detection module, an external environment information detection module, a vehicle driving information detection module, an air conditioner detection module, or a light detection module, etc. The vehicle speed detection module may be, for example, a speed sensor or an acceleration sensor, etc.

In this embodiment, after the vehicle is powered on, each detection module of the vehicle may start to send vehicle status information to the vehicle communication network. After initialization of the vehicle-mounted device is completed, the vehicle communication network may send the vehicle status information to the vehicle-mounted device, and then the vehicle-mounted device generates an API. Alternatively, when an SDK is integrated, the vehicle status information is sent to the corresponding third-party application for processing according to the invoking of the API performed by the third-party application.

In this embodiment, after the vehicle is powered on, each actuator of the vehicle may receive the control instruction through the vehicle communication network. After initialization of the vehicle-mounted device is completed, the vehicle communication network may send the control instruction to the vehicle-mounted device, and then the vehicle-mounted device generates an API. Alternatively, when an SDK is integrated, the vehicle-mounted device may send the control instruction to the corresponding actuator according to the invoking of the API performed by the third-party application.

In this embodiment, the vehicle-mounted device may receive, through the vehicle communication network, the vehicle status information sent by each detection module, and/or send the control instructions to each actuator. The vehicle communication network includes a communication gateway and a communication bus. The vehicle-mounted device and the communication gateway communicate with each other by using a preset communication rule, to receive the vehicle status information of the detection module on the communication bus and deliver the control instruction to the corresponding actuator on the vehicle through the communication gateway. The communication bus is, for example, a CAN bus, etc.

On the basis of the above embodiment, the vehicle-mounted device includes: a protocol analyzing module and an API packaging module. The protocol analyzing module is configured to analyze the vehicle signal to obtain the protocol analysis mode of the vehicle signal. The API packaging module is configured to generate, through packaging, the corresponding API according to the protocol analysis mode and the API specifications.

In this embodiment, a format of the vehicle signal received by the vehicle-mounted device varies in case of different detection modules or different actuators or different communication buses. For example, the communication bus is a CAN bus and the detection module is a fuel level detection module. In this case, the vehicle state information obtained by the vehicle-mounted device may specifically be CAN message information including a fuel level. The fuel level is at a specific position in the CAN message information. According to a format of the CAN message information and the position of the fuel level in the CAN message information, etc., the protocol analyzing module may obtain a protocol analysis mode of the CAN message information including the fuel level. Then the API packaging module may generate, through packaging, the corresponding API according to the protocol analysis mode and the API specifications.

On the basis of the above embodiment, the protocol analyzing module may be specifically configured to analyze the vehicle signal to obtain an analyzed vehicle signal; determine, according to the analyzed vehicle signal, whether to allow the vehicle signal to be opened to a third-party application; and if the vehicle signal is not allowed to be opened to the third-party application, perform no processing. A vehicle signal not allowed to be opened to the third-party application may be, for example, a vehicle signal related to vehicle control.

In this embodiment, after analyzing the vehicle signal, the protocol analyzing module may first query a signal list according to the analyzed vehicle signal. The signal list includes a vehicle signal allowed to be opened to the third-party application or a vehicle signal not allowed to be opened to the third-party application. The protocol analyzing module determines, according to a result of querying the signal list, whether to allow the vehicle signal to be opened to the third-party application. If the vehicle signal is not allowed to be opened to the third-party application, the protocol analysis mode of the vehicle signal is not obtained, and the corresponding API is not generated. In this way, the third-party application cannot obtain the corresponding vehicle signal through the API, improving vehicle safety.

On the basis of the above embodiment, the developer platform may include: an SDK publishing module and an APP publishing module. The SDK publishing module publishes the SDK after obtaining the SDK sent by the vehicle-mounted device, so that a developer develops, according to the API in the SDK, a third-party application that may be installed on the vehicle-mounted device. The APP publishing module obtains a developed third-party application uploaded by the developer and publishes the developed third-party application.

Before publishing the developed third-party application, the APP publishing module may first verify the third-party application to determine whether the third-party application meets agreed conditions. The agreed conditions may be, for example, whether the third-party application is an application developed by an agreed developer or enterprise, whether the vehicle signal to be obtained for the third-party application to run is allowed to be opened to the third-party application, whether permission of the third-party application is consistent with agreed permission, and whether a key carried in the third-party application is consistent with an agreed key, etc.

In this embodiment, before publishing the developed third-party application, the APP publishing module may first verify the third-party application to determine whether the third-party application meets agreed conditions. In this way, a third-party application that does not meet the agreed conditions can be prevented from being published on the developer platform, so that the third-party application that does not meet the agreed conditions is prevented from being installed on the vehicle-mounted vehicle, thereby improving safety of the vehicle.

On the basis of the above embodiment, the vehicle-mounted device further includes: an application market. The application market is synchronized with the developer platform to obtain relevant information of the third-party application published on the developer platform.

In this embodiment, after obtaining the relevant information of the third-party application published by the developer platform, the application market may display the third-party application on an interface of the application market according to the relevant information of the third-party application, so that a user of the vehicle can perform selection and downloading.

In this embodiment, when the user selects the third-party application and hits downloading, the application market may obtain a third-party application downloading instruction of the user, and download the third-party application from the developer platform according to the third-party application downloading instruction.

On the basis of the above embodiment, after being successfully downloaded, the third-party application is installed on the vehicle-mounted device and started, and then the third-party application may invoke a corresponding API to obtain and process vehicle status information of a corresponding detection module on the vehicle, or send a control instruction to a corresponding actuator on the vehicle. An SDK is integrated in the third-party application.

On the basis of the above embodiment, the vehicle-mounted device receives an API invoking request of the third-party application installed on the vehicle-mounted device, obtains the vehicle status information from a corresponding detection module on a vehicle in combination with the protocol analysis mode corresponding to the API and the API specifications, and returns the vehicle status information to the third-party application.

It should be noted that, for details not disclosed in the method for developing a third-party application, refer to the details disclosed in the system for developing a third-party application in the embodiment of the present disclosure, and the details are not described herein again.

In the system for developing a third-party application in the embodiment of the present disclosure, the vehicle-mounted device generates the corresponding API according to the protocol analysis mode of the vehicle signal and the API specifications, adds the API to the software development kit SDK, and sends the API to the developer platform. The developer platform publishes the SDK so that the developer develops a third-party application according to the API in the SDK. Development difficulty is low, costs are low, and universal applicability is provided. In addition, the developed third-party application can provide a user with vehicle-specific functions based on the vehicle signal. After the third-party application is installed on the vehicle-mounted device, vehicle-mounted multimedia can provide a user with vehicle-specific functions, improving experience of the user when using the vehicle-mounted multimedia.

In the present disclosure, unless otherwise explicitly specified or defined, the terms such as "mount", "install", "connect", "connection", and "fixed" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components or mutual interaction relationship between two components. A person of ordinary skill in the art can understand specific meanings of the terms in the present disclosure based on specific situations.

In the description of this specification, the description of the reference terms "an embodiment", "some embodiments", "an example", "a specific example", "some examples," and the like means that specific features, structures, materials or characteristics described in combination with the embodiment(s) or example(s) are included in at least one embodiment or example of the present disclosure. In this specification, exemplary representations of the above terms do not necessarily refer to the same embodiment or example. Moreover, the described specific features, structures, materials or characteristics may be combined in a suitable manner in any one or more embodiments or examples. In addition, in a case that is not mutually contradictory, a person skilled in the art can combine or group different embodiments or examples that are described in this specification and features of the different embodiments or examples.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A system for developing a third-party application, comprising: a vehicle-mounted device and a developer platform communicating with each other;
wherein the vehicle-mounted device is configured to:
obtain a vehicle signal, wherein the vehicle signal comprises:
vehicle status information sent by each detection module through a vehicle communication network,
a control instruction to be sent to each actuator through the vehicle communication network, or
the vehicle status information and the control instruction; and
generate a corresponding API according to a protocol analysis mode of the vehicle signal and API specifications, add the API to a software development kit SDK, and send the API to the developer platform; and
wherein the developer platform is configured to publish the SDK so that a developer is able to develop a third-party application according to the API in the SDK.

2. The system according to claim 1, wherein the vehicle-mounted device comprises: a protocol analyzing module and an API packaging module, wherein
the protocol analyzing module is configured to analyze the vehicle signal to obtain the protocol analysis mode of the vehicle signal; and
the API packaging module is configured to generate, through packaging, the corresponding API according to the protocol analysis mode and the API specifications.

3. The system according to claim 2, wherein the protocol analyzing module is specifically configured to:
analyze the vehicle signal to obtain an analyzed vehicle signal;
determine, according to the analyzed vehicle signal, whether to allow the vehicle signal to be opened to a third-party application; and
if the vehicle signal is not allowed to be opened to the third-party application, perform no processing.

4. The system according to claim 3, wherein the vehicle-mounted device further comprises: an application market;
wherein the application market is configured to be synchronized with the developer platform to obtain relevant information of the third-party application published on the developer platform, wherein the third-party application published on the developer platform meets agreed conditions.

5. The system according to claim 4, wherein the application market is further configured to obtain a third-party application downloading instruction of a user, and download the third-party application from the developer platform according to the third-party application downloading instruction.

6. The system according to claim 5, wherein the vehicle-mounted device is further configured to: receive an API invoking request of the third-party application installed on the vehicle-mounted device, obtain the vehicle status information from a corresponding detection module on a vehicle in combination with the protocol analysis mode corresponding to the API and the API specifications, and return the vehicle status information to the third-party application; or send a control instruction to a corresponding actuator on the vehicle.

7. The system according to claim 6, wherein the vehicle communication network comprises a communication gateway and a communication bus, wherein
the vehicle-mounted device and the communication gateway communicate with each other by using a preset communication rule, to receive the vehicle status information of the detection module on the communication bus and deliver the control instruction to the corresponding actuator on the vehicle through the communication gateway.

8. The system according to claim 2, wherein the vehicle-mounted device further comprises: an application market;
wherein the application market is configured to be synchronized with the developer platform to obtain relevant information of the third-party application published on the developer platform, wherein the third-party application published on the developer platform meets agreed conditions.

9. The system according to claim 1, wherein the vehicle-mounted device further comprises: an application market;
wherein the application market is configured to be synchronized with the developer platform to obtain relevant information of the third-party application published on the developer platform, wherein the third-party application published on the developer platform meets agreed conditions.

10. The system according to claim 9, wherein the application market is further configured to obtain a third-party application downloading instruction of a user, and download the third-party application from the developer platform according to the third-party application downloading instruction.

11. The system according to claim 10, wherein the vehicle-mounted device is further configured to: receive an API invoking request of the third-party application installed on the vehicle-mounted device, obtain the vehicle status information from a corresponding detection module on a vehicle in combination with the protocol analysis mode corresponding to the API and the API specifications, and return the vehicle status information to the third-party application; or send a control instruction to a corresponding actuator on the vehicle.

12. The system according to claim 1, wherein the vehicle-mounted device is further configured to: receive an API invoking request of the third-party application installed on the vehicle-mounted device, obtain the vehicle status information from a corresponding detection module on a vehicle in combination with the protocol analysis mode corresponding to the API and the API specifications, and return the vehicle status information to the third-party application; or send a control instruction to a corresponding actuator on the vehicle.

13. The system according to claim 1, wherein the vehicle communication network comprises a communication gateway and a communication bus, wherein
the vehicle-mounted device and the communication gateway communicate with each other by using a preset communication rule, to receive the vehicle status information of the detection module on the communication bus and deliver the control instruction to the corresponding actuator on the vehicle through the communication gateway.

14. A method for developing a third-party application, wherein a vehicle-mounted device and a developer platform communicate with each other, and the method comprises the following steps:

obtaining, by the vehicle-mounted device, a vehicle signal, the vehicle signal comprising:
- vehicle status information sent by each detection module through a vehicle communication network,
- a control instruction to be sent to each actuator through the vehicle communication network, or
- the vehicle status information and the control instruction;

generating a corresponding API according to a protocol analysis mode of the vehicle signal and API specifications, adding the API to a software development kit SDK, and sending the API to the developer platform; and publishing, by the developer platform, the SDK so that a developer is able to develop a third-party application according to the API in the SDK.

15. The method according to claim 14, wherein the vehicle-mounted device comprises: a protocol analyzing module and an API packaging module, wherein
- the protocol analyzing module is configured to analyze the vehicle signal to obtain the protocol analysis mode of the vehicle signal; and
- the API packaging module is configured to generate, through packaging, the corresponding API according to the protocol analysis mode and the API specifications.

16. The method according to claim 15, wherein the protocol analyzing module is configured to:
- analyze the vehicle signal to obtain an analyzed vehicle signal;
- determine, according to the analyzed vehicle signal, whether to allow the vehicle signal to be opened to a third-party application; and
- if the vehicle signal is not allowed to be opened to the third-party application, perform no processing.

17. The method according to claim 14, wherein the vehicle-mounted device further comprises: an application market;
wherein the application market is synchronized with the developer platform to obtain relevant information of the third-party application published on the developer platform, wherein the third-party application published on the developer platform meets agreed conditions.

18. The method according to claim 17, comprising: obtaining, by the application market, a third-party application downloading instruction of a user, and downloading the third-party application from the developer platform according to the third-party application downloading instruction.

19. The method according to claim 14, comprising: receiving, by the vehicle-mounted device, an API invoking request of the third-party application installed on the vehicle-mounted device, obtaining the vehicle status information from a corresponding detection module on a vehicle in combination with the protocol analysis mode corresponding to the API and the API specifications, and returning the vehicle status information to the third-party application; or sending a control instruction to a corresponding actuator on the vehicle.

20. The method according to claim 14, wherein the vehicle communication network comprises a communication gateway and a communication bus, wherein
the vehicle-mounted device and the communication gateway communicate with each other by using a preset communication rule, to receive the vehicle status information of the detection module on the communication bus and deliver the control instruction to the corresponding actuator on the vehicle through the communication gateway.

* * * * *